United States Patent

Bischoff et al.

[11] Patent Number: 5,886,959
[45] Date of Patent: Mar. 23, 1999

[54] THIN-FILM ELECTRO-MAGNETIC COIL DESIGN FOR USE IN A FLYING MAGNETO-OPTICAL HEAD

[75] Inventors: Peter G. Bischoff, Los Altos Hills; Yugang Wang, Milpitas, both of Calif.

[73] Assignees: Read-Rite Corporation; Quinta Corporation, both of Calif.

[21] Appl. No.: 19,225

[22] Filed: Feb. 4, 1998

Related U.S. Application Data

[63] Continuation-in-part of Ser. No. 844,167, Apr. 18, 1997.

[51] Int. Cl.$^6$ .................................................. G11B 11/00
[52] U.S. Cl. ............................................. 369/13; 360/114
[58] Field of Search ................................... 369/13, 44.14, 369/44.23, 44.26, 44.38, 44.39, 14, 111; 360/114, 59, 103, 104, 66, 60, 122

[56] References Cited

U.S. PATENT DOCUMENTS

| | | | |
|---|---|---|---|
| 4,890,178 | 12/1989 | Ichibara | 360/114 |
| 5,022,018 | 6/1991 | Vogelgesang et al. | |
| 5,072,324 | 12/1991 | Lin et al. | 360/126 |
| 5,105,408 | 4/1992 | Lee et al. | 369/44.15 |
| 5,124,961 | 6/1992 | Yamaguchi et al. | 369/13 |
| 5,197,050 | 3/1993 | Murakami et al. | 369/13 |
| 5,287,334 | 2/1994 | Iwabuchi et al. | 369/13 |
| 5,295,122 | 3/1994 | Murakami et al. | 369/13 |
| 5,307,328 | 4/1994 | Jacobs et al. | 369/13 |
| 5,331,496 | 7/1994 | Wu et al. | 360/126 |
| 5,370,766 | 12/1994 | Desaigoudar et al. | 156/643 |
| 5,402,293 | 3/1995 | Smith | 360/114 |
| 5,544,131 | 8/1996 | Albertini et al. | 369/13 |
| 5,563,871 | 10/1996 | Bargerhuff et al. | 369/119 |
| 5,572,179 | 11/1996 | Ito et al. | 336/200 |
| 5,615,183 | 3/1997 | Ishii | 369/13 |
| 5,642,336 | 6/1997 | Albertini et al. | 369/13 |
| 5,703,840 | 12/1997 | Kazama | 369/13 |
| 5,784,343 | 7/1998 | Watanabe et al | 369/13 |

FOREIGN PATENT DOCUMENTS

| | | |
|---|---|---|
| 03-113-756 A | 5/1991 | Japan . |
| 03-260-396 A | 11/1991 | Japan . |
| 06-325-426 A | 11/1994 | Japan . |

*Primary Examiner*—Ali Neyzari
*Attorney, Agent, or Firm*—Mark Wardas; Robert King; Samuel A. Kassatly

[57] ABSTRACT

A thin-film coil for use in a flying magneto-optical data storage system is formed on an undercoat layer, and includes an underside and a conductor deposited on the undercoat layer. The conductor is covered by an insulation layer on which a yoke is formed for providing a path to a magnetic field generated by the conductor. The yoke is formed of three sections: an upper section, an intermediate section, and the tip. The yoke tip defines an optical opening and has its underside substantially flush with the underside of the undercoat layer for increasing the density of the magnetic field at a target distance from the coil. The yoke tip underside is defined by an inner edge that delineates the optical opening, and that is formed of two semi-circular sections and two linear sections tangential to the semi-circular sections. The yoke can optionally include an outer section that extends over the peripheral side of the insulation layer and that further extends in an enlarged toe section.

28 Claims, 15 Drawing Sheets

THIN-FILM ELECTRO-MAGNETIC COIL DESIGN FOR USE IN A FLYING MAGNETO-OPTICAL HEAD

CROSS-REFERENCE TO RELATED APPLICATION

The present patent application is a continuation-in-part of patent application titled "Coil for Use with Magneto-Optical Head", Ser. No. 08/844,167, filed on Apr. 18, 1997 by McDaniel et al., which is incorporated herein by reference.

BACKGROUND OF THE INVENTION

1. Field of the Invention

This invention relates generally to optical and magneto-optical data storage systems, and in particular to a thin film electro-magnetic coil for use in flying magneto-optical heads.

2. Description of Related Art

A conventional magnetic storage system includes a magnetic head that has a slider element and a magnetic read/write element, and is coupled to a rotary actuator magnet and a voice coil assembly by a suspension and an actuator arm to be positioned over a surface of a spinning magnetic disk. In operation, lift forces are generated by aerodynamic interactions between the magnetic head and the spinning magnetic disk. The lift forces are opposed by equal and opposite spring forces applied by the suspension such that a predetermined flying height is maintained over a full radial stroke of the rotary actuator assembly above the surface of the spinning magnetic disk.

Flying head designs have been proposed for use with optical and magneto-optical (MO) storage technology. One motivation for using the magneto-optical technology stems from the availability of a higher areal density with magneto-optical storage disks than magnetic storage disks. However, despite the historically higher areal storage density available for use with magneto-optical disks drives, the prior art magneto-optical disk drive volumetric storage capacity has generally not kept pace with the volumetric storage capacity of magnetic disk drives.

One factor that limits MO disk drives is the coil that generates the necessary magnetic field for writing data on the MO disk. The magnetic field is applied to a spot of interest on the MO disk from the direction of the incident laser beam, or from the opposite direction. However, the magnetic coils used in these commercial magneto-optical heads are relatively large and heavy devices with bulky hand wound coils. These large magnetic coils generally have high inductance and low resonance frequencies leading to background noise problems at higher data transfer rates.

The following patents provide examples of electro-magnetic coil designs for use in various applications, including data storage systems:

U.S. Pat. No. 4,890,178 to Ichibara;
U.S. Pat. No. 5,022,018 to Vogelgesang et al;
U.S. Pat. No. 5,072,324 to Lin et al.;
U.S. Pat. No. 5,105,408 to Lee et al.;
U.S. Pat. No. 5,124,961 to Yamaguchi et al.;
U.S. Pat. No. 5,197,050 to Murakami et al.;
U.S. Pat. No. 5,295,122 to Murakami et al.;
U.S. Pat. No. 5,307,328 to Jacobs et al.; and
U.S. Pat. No. 5,331,496 to Wu et al.;
U.S. Pat. No. 5,370,766 to Desaigoudar et al.;
U.S. Pat. No. 5,544,131 to Albertini et al.;
U.S. Pat. No. 5,563,871 to Bargerhuff et al.;
U.S. Pat. No. 5,572,179 to Ito et al.;
U.S. Pat. No. 5,615,183 to Ishii;
U.S. Pat. No. 5,642,336 to Albertini et al;
Japanese patent application No. 59-117180;
Japanese patent application No. 06-325-426 A;
Japanese patent application No. 03-260-936 A; and
Japanese patent application No. 03-113-756 A.

What is needed, therefore, is an electro-magnetic coil that presents an improvement over conventional coils. The new coil should improve the disk access time, improve the areal storage density of storage media, and reduce the head weight and size.

SUMMARY OF THE INVENTION

One aspect of the present invention is to provide an electro-magnetic coil for attachment to a slider in a flying optical or magneto-optical data storage system. The coil assembly has compact, low mass, and high field characteristics, and generates a large magnetic field intensity in the vertical direction.

Another aspect of the coil assembly resides in its relatively inexpensive mass production and assembly cost. The manufacturing process of the coil assembly is compatible with proven wafer processing techniques, and provides highly efficient throughput for mass production.

The coil assembly has a low inductance, thus increasing the resonance frequency of the head and improving its data recording rates. The small size and low mass of the coil assembly further improves the head data access rates.

The foregoing and other objects and features of the present invention are achieved by a thin-film coil made on an undercoat layer and comprised of an electrically conductive coil formed on the undercoat layer. The coil is covered by an insulation layer, and a yoke is formed on the insulation layer for providing a magnetic path to the magnetic field generated by the coil. The yoke is formed of three sections: an upper section, an intermediate section, and the tip. The yoke tip defines an optical opening and has its underside substantially flush with the undercoat layer for increasing the effective magnetic field density of the coil. The tip underside is defined by an inner edge, which delineates the optical opening, and which is formed of two semi-circular sections and two linear sections tangential to the semi-circular sections. In another embodiment the coil further includes an additional turn formed within the undercoat layer in close proximity to the yoke tip, in order to further enhance the magnetic field density generated by the coil at a target point on, or within the data storage medium.

BRIEF DESCRIPTION OF THE DRAWINGS

The features of the present invention and the manner of attaining them, will become apparent and the invention itself will be understood by reference to the following description and the accompanying drawings, wherein.

Similar numerals refer to similar elements in the drawings. It should be understood that the sizes of the different components in the figures may not be in exact proportion, and are shown for visual clarity and for the purpose of explanation.

DETAILED DESCRIPTION OF THE INVENTION

Figure 1:
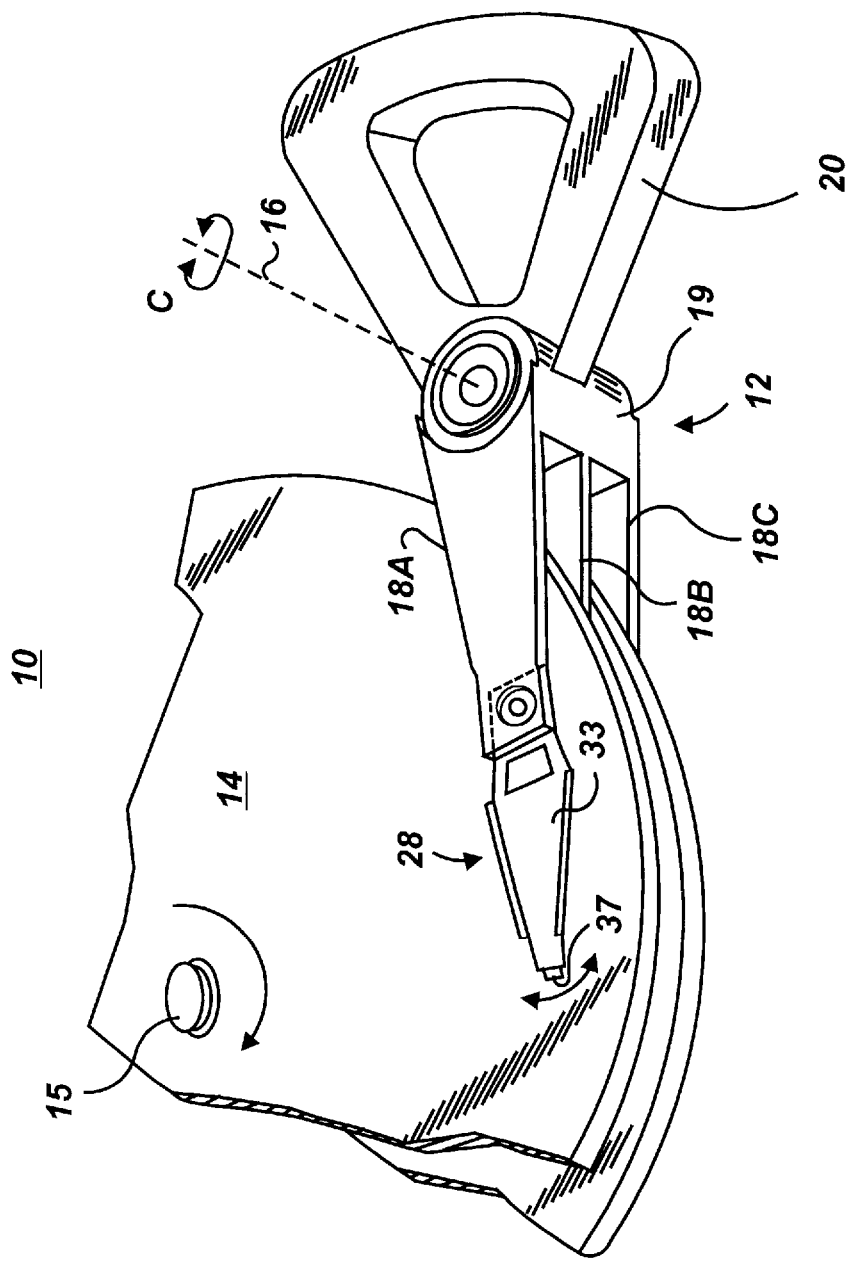
FIG. 1 is a fragmentary perspective view of a magneto-optical (MO) data storage system utilizing an electro-magnetic coil according to the invention.

FIG. 1 illustrates a disk drive 10 comprised of a head stack assembly 12 and a stack of spaced apart optical or MO data storage disks or media 14 that are rotatable about a common shaft 15. The head stack assembly 12 is rotatable about an actuator axis 16 in the direction of the arrow C. The head stack assembly 12 includes a number of actuator arms, only three of which 18A, 18B, 18C are illustrated, which extend into spacings between the disks 14.

The head stack assembly 12 further includes an actuator block 19 and a magnetic rotor 20 attached to the block 19 in a position diametrically opposite to the actuator arms 18A, 18B, 18C. The rotor 20 cooperates with a stator (not shown) for rotating in an arc about the actuator axis 16. Energizing the coil of the rotor 20 with a direct current in one polarity or the reverse polarity causes the head stack assembly 12, including the actuator arms 18A, 18B, 18C, to rotate about the actuator axis 16 in a direction radial to the disks 14.

Figure 2:
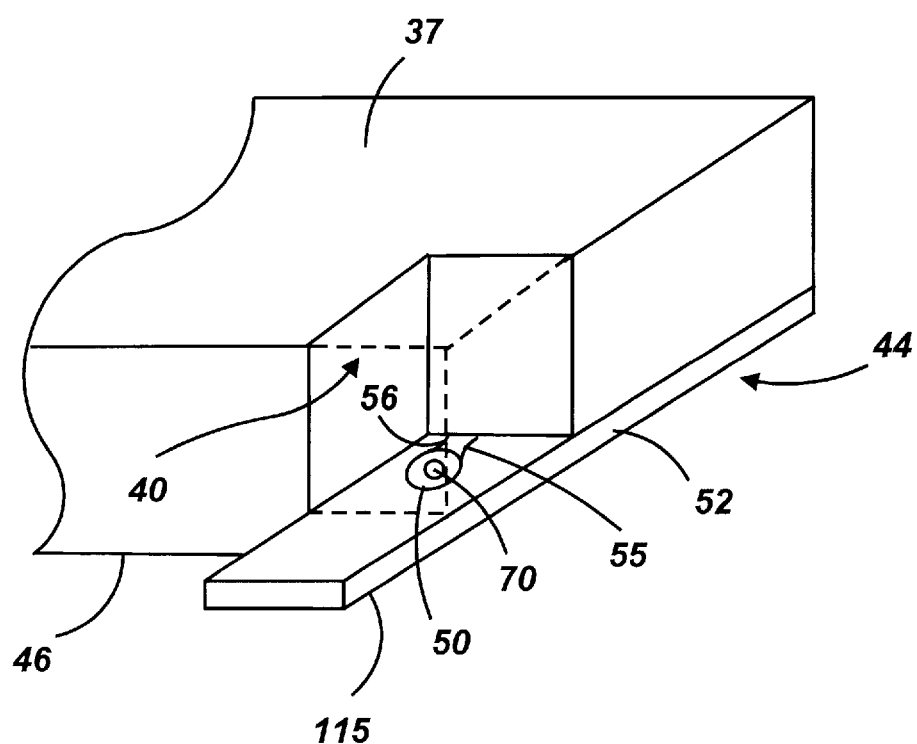
FIG. 2 is an enlarged, fragmentary, perspective view of the electro-magnetic coil of FIG. 1, shown secured to a slider and an optical assembly forming part of the MO data storage system of FIG. 1.
Figure 3:
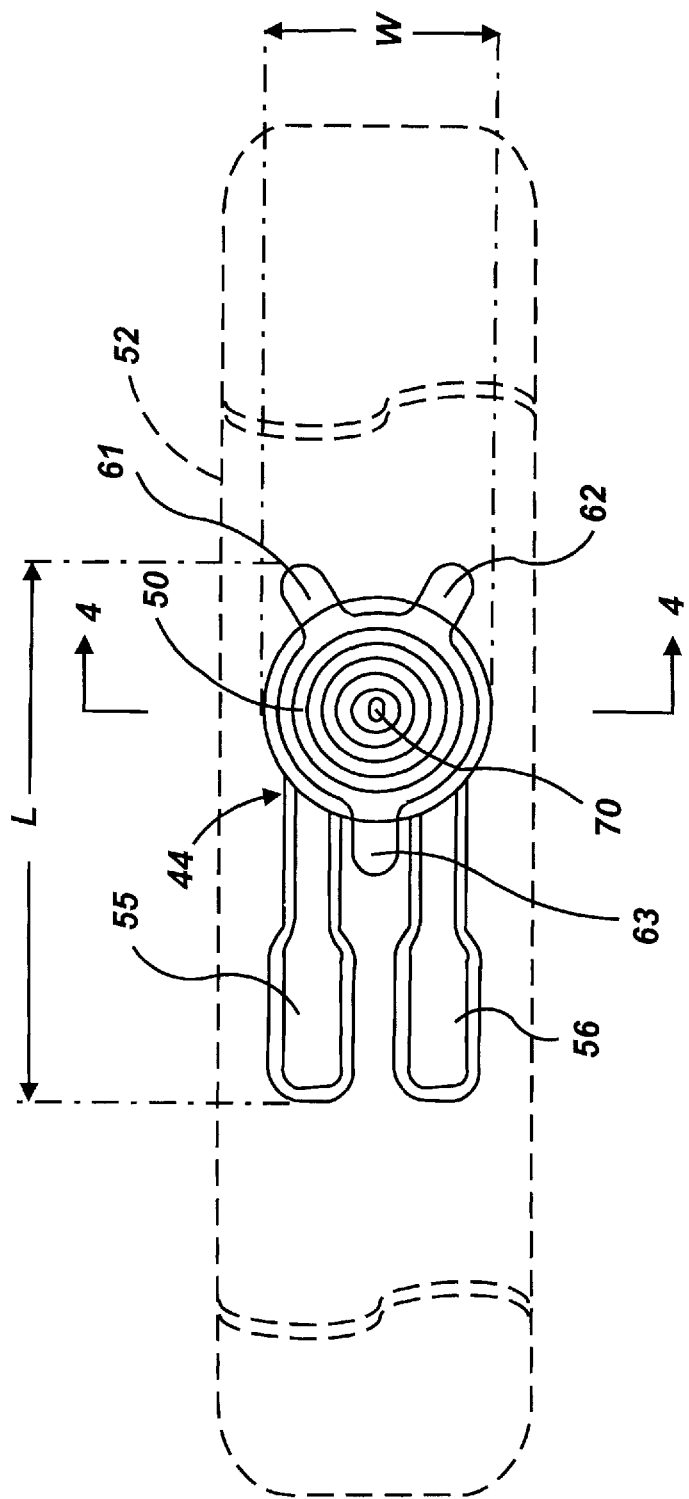
FIG. 3 is an enlarged top plan view of the electro-magnetic coil of FIG. 2.

A head gimbal assembly (HGA) 28 is secured to each of the actuator arms, for instance 18A. The HGA 28 comprises a resilient load beam 33 and a slider 37 secured to the free end of the load beam 33. The slider 37 is also referred to herein as a support element since it supports an optical assembly 40 (FIG. 2) and/or an electro-magnetic coil 44 (FIG. 2). The optical assembly 40 is illustrated by a block drawn in dashed lines, and is secured to the HGA 28 and in particular to the slider 37 for providing the required optical reading and writing beams. An exemplary embodiment of the optical assembly 40 is described in the co-pending patent application Ser. No. 08/844,167.

The coil 44 can be secured to the underside (or air bearing surface side) 46 of the slider 37, which is the surface facing the disk 14, and to the optical assembly 40. It should however be understood that the coil 44 can be secured either to the slider 37 or to the optical assembly 40.

The details of the coil 44 will now be described with reference to FIGS. 3, 4, 5, 6, 7, 8 and 9. The coil 44 comprises an electrical conductor 50, and is formed by means of available thin-film wafer processing techniques. The coil 44 has compact, low mass, and high field characteristics, and allows direct overwrite at a low flying height, with precise control of the focal plane of the optical assembly 40. The coil 44 does not interfere with vertical axis motion, thus ensuring that the focal plane of the optical assembly 40 coincides generally with a MO layer 53 (FIG. 5) of the disk 14.

The overall mass of the coil 44 may range between approximately 10 micrograms to 100 micrograms. The size compactness of the coil 44 allows for an efficient design and results in a high magnetic field. The overall dimensions of the coil 44 are significantly smaller than the slider underside 46. In addition, since the coil 44 is mounted directly on the slider 37 and/or the optical assembly 40, the flying height of the slider 37 is not significantly affected by the presence of the coil 44, thus ensuring the precise control of the flying height of the slider 37 above the disk 14 and the precise control of the vertical axis motion. As used herein, "vertical axis motion" refers to the focusing axis (or optical path) of an optical beam generated by the optical assembly 40. In addition, the minimal thickness of the coil 44 reduces the overall z-height (e.g. the vertical height or inter-disk spacing) of the head stack assembly 12, thus enabling the disk drive 10 to accommodate an optimal number of disks 14 in a predetermined space.

The coil 44 further includes two bonding pads 55, 56 for providing electrical connection means to the conductor 50. The bonding pads 55, 56 can be made of electroplated soft gold typically used in ultrasonic wire bonding applications. They are formed on a substrate 52 using available deposition techniques, and are connected to the two terminal ends 55A, 56A (FIG. 8) of the conductor 50. The conductor 50 is firmly secured to the substrate 52 by means of three contact pads 61, 62, 63. It should be clear to a person of ordinary skills in the field that a different number of contact pads can alternatively be used.

A central optical passage 70 is defined at the geometric center of the conductor 50, for allowing an optical beam (e.g. a laser beam) 72 (FIG. 5) to pass through. In one embodiment the central optical passage 70 has a substantially circular contour and has its diameter vary between about 0.4 mil to about 1 mil, where one mil is equal to one thousandth of one inch. In another embodiment the central optical passage 70 has an elliptically shaped contour. In still another embodiment, the central optical passage 70 has a square or rectangularly shaped contour, with its sides dimensions varying between about 0.4 mil to about 1 mil, with the longer side being generally oriented substantially perpendicularly to the track direction of the disk 14 (i.e., radially relative to the disk 14), for allowing the inter-track excursion of the optical beam 72. Other dimensions and shapes can alternatively be selected provided they do not interfere with the free passage of the optical beam 72. One such shape will be described later in connection with FIGS. 11 and 13.

The following exemplary dimensions for the coil 44 are included for illustration purpose and are not intended to limit the present invention. The length "L" of the coil 44 ranges between approximately 30 mils and approximately 80 mils. The width "W" of the coil 44 ranges between approximately 20 mils and approximately 40 mils.

The conductor 50 is coiled, and is encapsulated, at least in part, within an insulation layer 86. The insulation layer 86 is covered by a yoke 84 having a central optical opening 70A that coincides and is aligned with the optical opening 70 of the coil 50. The optical or laser beam 72 passes through the central optical openings 70, 70A for impinging upon the disk 14. According to this illustrative embodiment the optical openings 70 and 70A have a generally circular or elliptical shape; however, other shapes can alternatively be selected.

Figure 8:
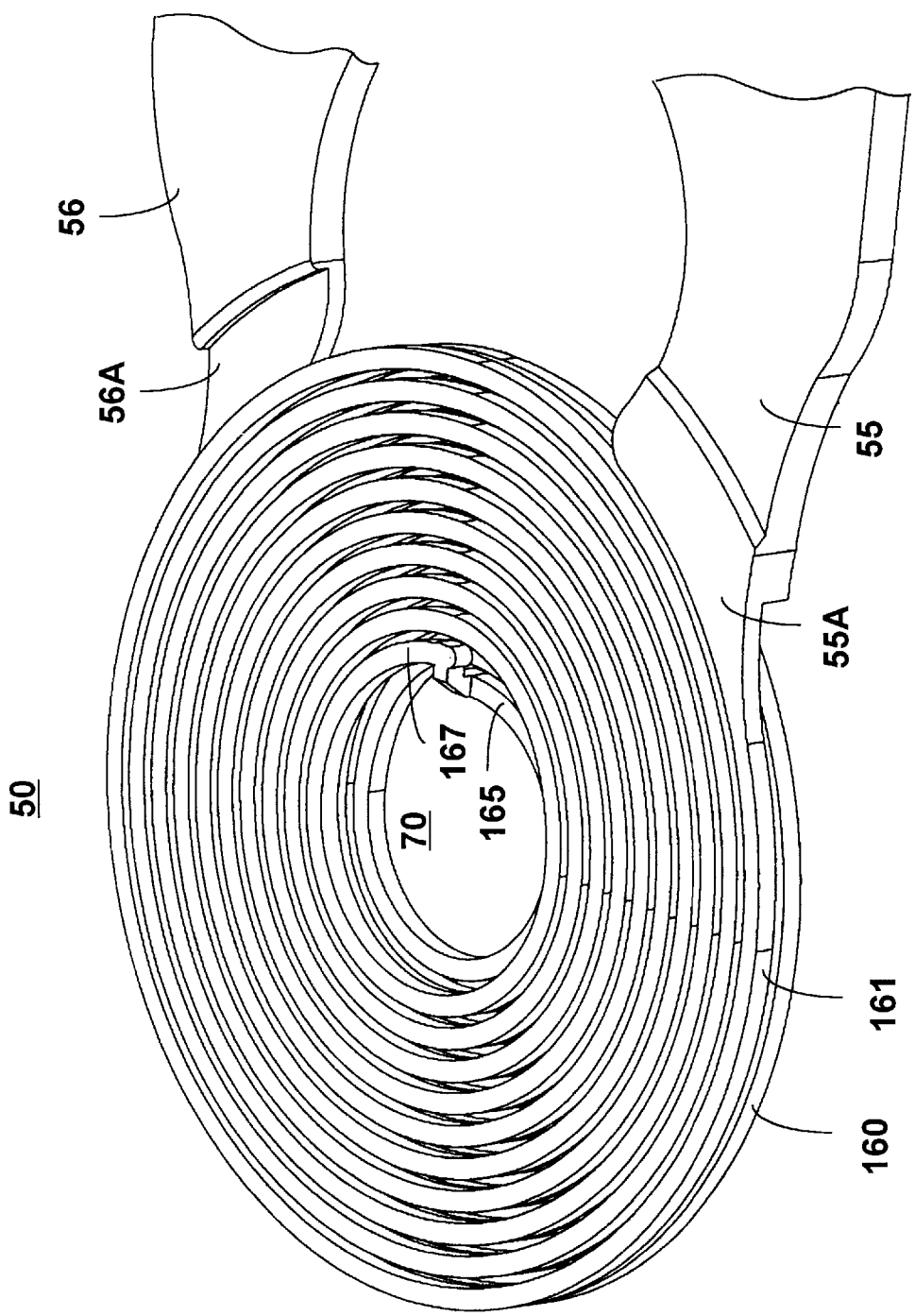
FIG. 8 is a perspective view of a two-layered coil conductor forming part of the coil of FIG. 3 and 4.
Figure 9:
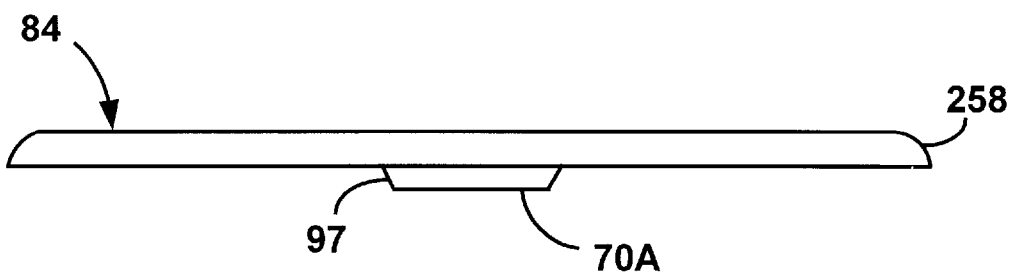
FIG. 9 is a side elevational view of the yoke forming part of the coil of FIGS. 3, 4 and 6, with the contact pads removed.
Figure 12:
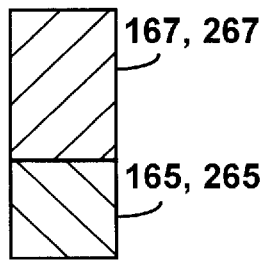
FIG. 12 is a cross-sectional view of a coiled conductor forming part of the coil of FIG. 11, taken along line 12 thereof, and showing a terminal end of one conductor layer overlaying a terminal end of another conductor layer.

The conductor 50 includes a plurality of multi-layered turns 93 (FIGS. 4, 5 and 8), for example 6 to 40 turns, with only two layers 160, 161 being shown. It should be understood that the conductor 50 can be coiled into a different number of layers. The first or bottom layer 160 is connected to the contact pad 56 (FIG. 8), and is looped helically, inwardly, and terminates in an innermost end 165 (FIGS. 8 and 12). The second or upper layer 161 starts with an innermost end 167 (FIGS. 8 and 12) that overlays the innermost end 165 of the first layer 160, in order to establish an electrical contact therewith, and to ensure the continuity of the electrical path formed by the conductor 50. The second layer 161 is coiled into a plurality of concentric helical turns 93, similar to, and preferably in the same coiling direction as the first layer 160, and is connected to the contact pad 55 at its terminal end 56A.

The conductor 50 is made of a suitable electrically conductive material such as copper. While the conductor 50 is illustrated as having a substantially uniform square cross section along its entire length, it should be understood that other appropriate shapes may be selected. The cross-sectional area of each turn 93 varies between approximately 6 microns square and approximately 300 microns square, and preferably between approximately 12 microns square and approximately 20 microns square.

Generally, the turns 93 are encapsulated within the protective insulation layer 86, and are inter-spaced and separated by a distance varying between approximately 1 micron and approximately 12 microns, and preferably between approximately 1.5 microns and approximately 4 microns. The insulation layer 86 is made of a suitable dielectric material, such as photoresist material.

Figure 4:
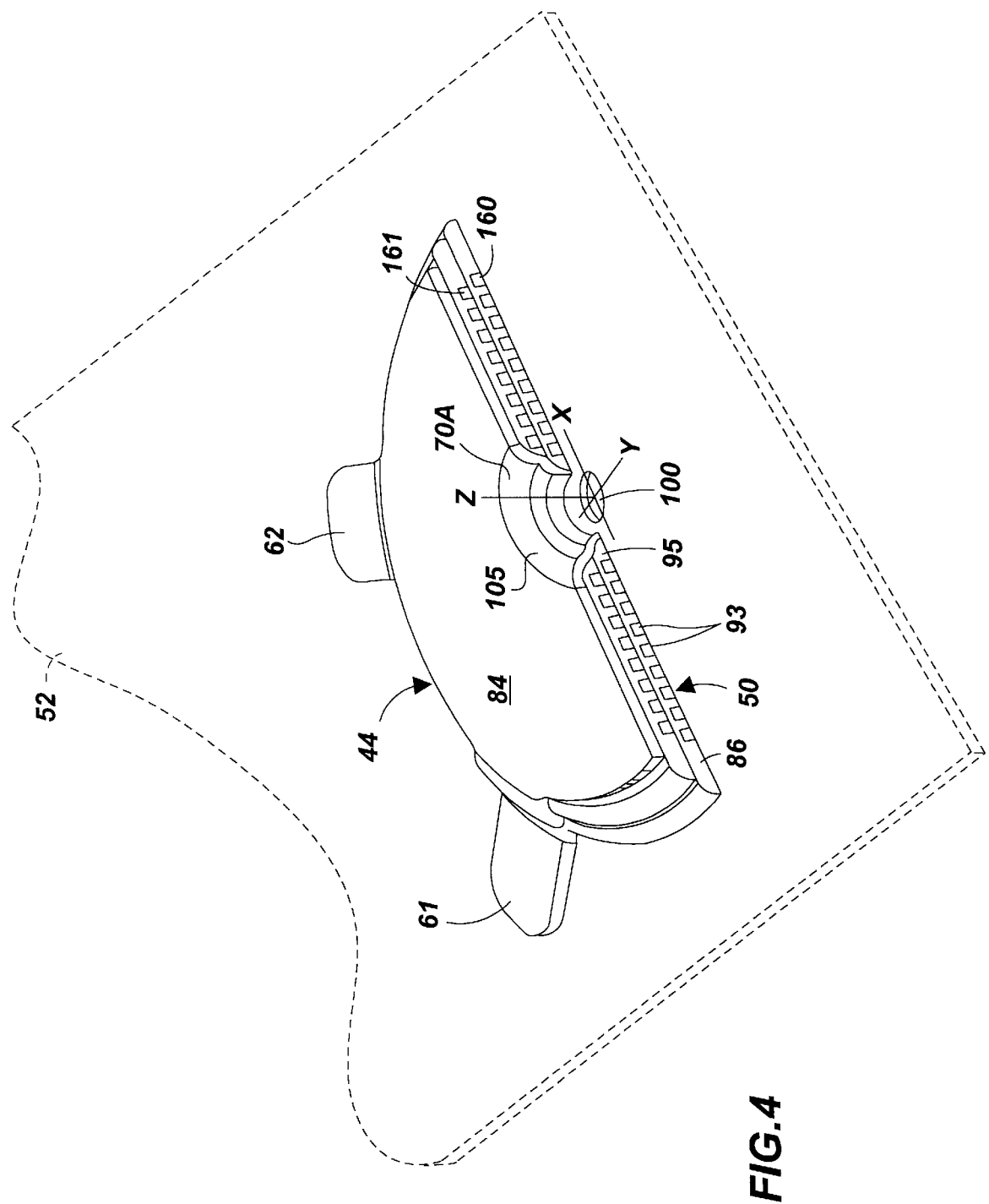
FIG. 4 is an enlarged, perspective, partly cross-sectional view of the electro-magnetic coil of FIG. 3, along line 4—4.
Figure 5:
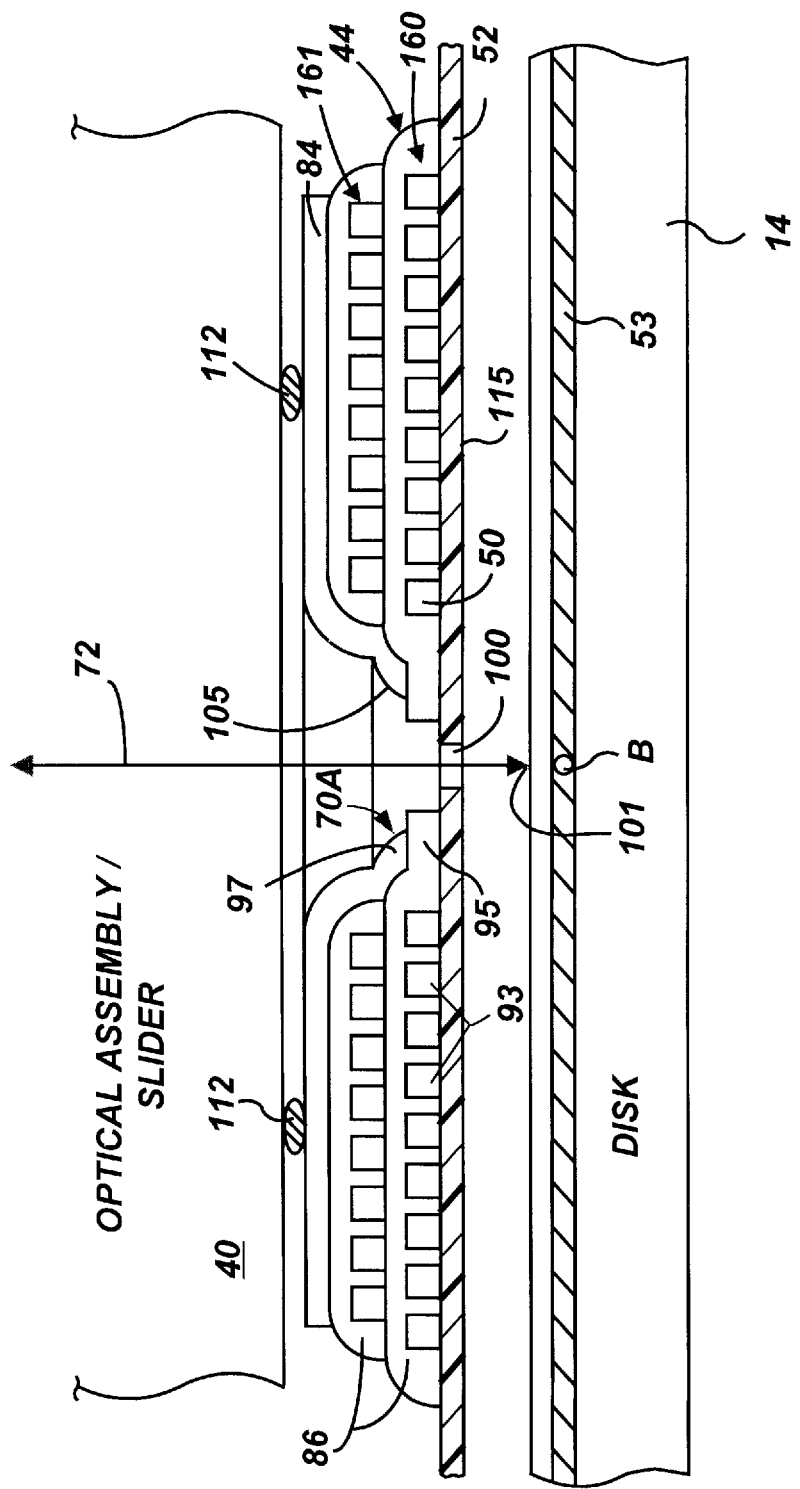
FIG. 5 is an enlarged, cross-sectional view of the electro-magnetic coil of FIG. 4, shown bonded to the optical assembly.

The insulation layer 86 defines a tip 95 that extends beyond and underneath the tip 97 of the yoke 84. The tip 95, as illustrated in the FIGS. 4 and 5 is ring-shaped and concentric relative to the central optical passage 70A and to another optical opening 100 in the substrate 52. The shape of the optical opening 100 is preferably similar to the contour to the optical passage 70A, and has either a diameter or a side ranging between approximately 15 $\mu$m and approximately 40 $\mu$m. Preferably, the diameter or side of the optical opening 100 ranges between approximately 13 $\mu$m and approximately 25 $\mu$m.

The tip 95 positions the yoke tip 97 relative to the disk 14, such that a light spot 101 formed by the laser beam 72 on the surface of the disk 14 coincides substantially with the maximum magnetic flux density (at point B) generated by the magnetic field on the MO layer 53. This allows for optimal polarization of the disk 14. While the inner surface 105 of the yoke 84 may taper inwardly, it should be understood that alternative configurations are also possible. For example, the inner surface 105 may be substantially straight or stepped.

Figure 5A:
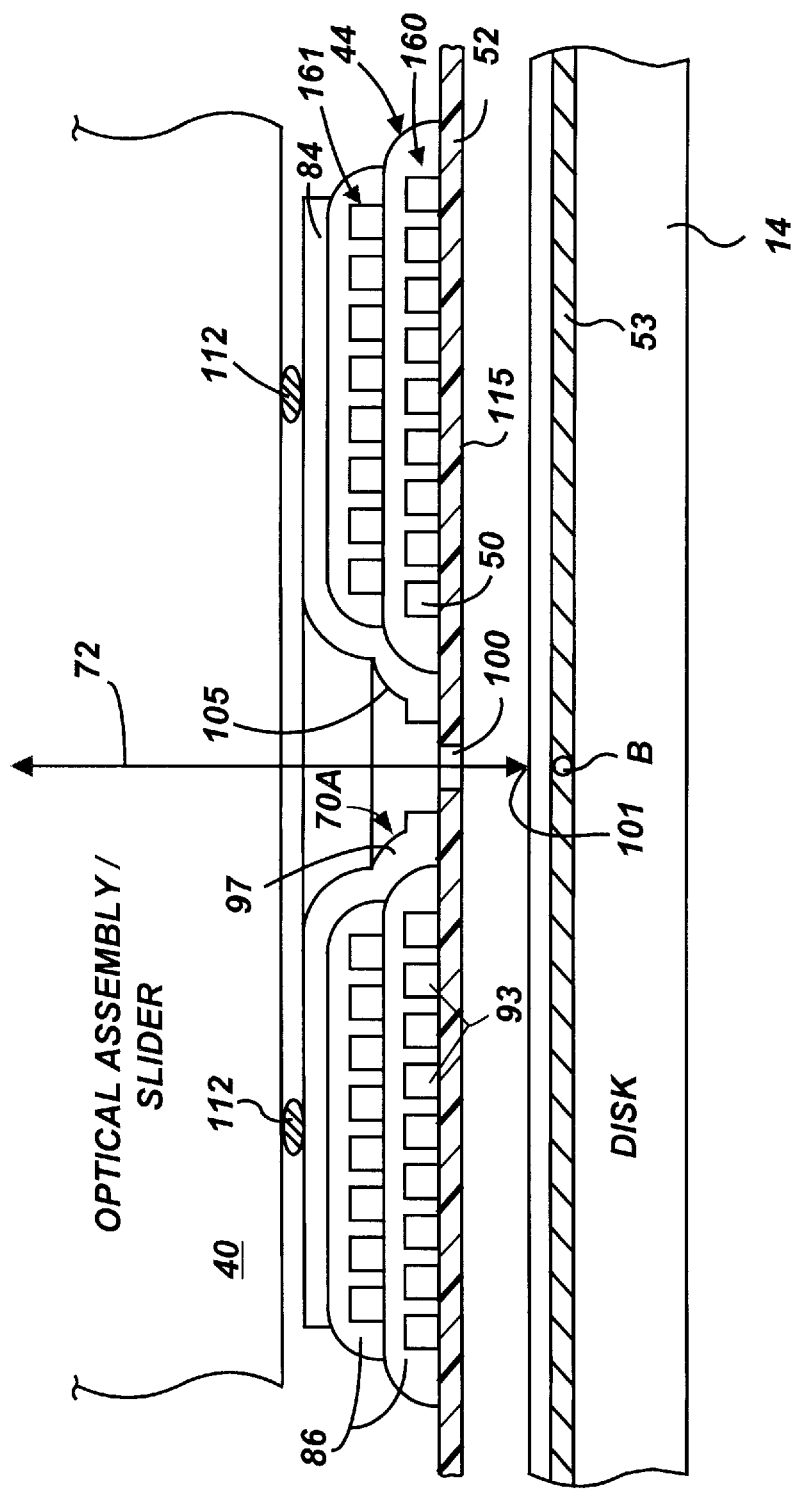
FIG. 5A is an enlarged, cross-sectional view of another embodiment of the electro-magnetic coil of FIG. 4, shown bonded to the optical assembly.
Figure 6:
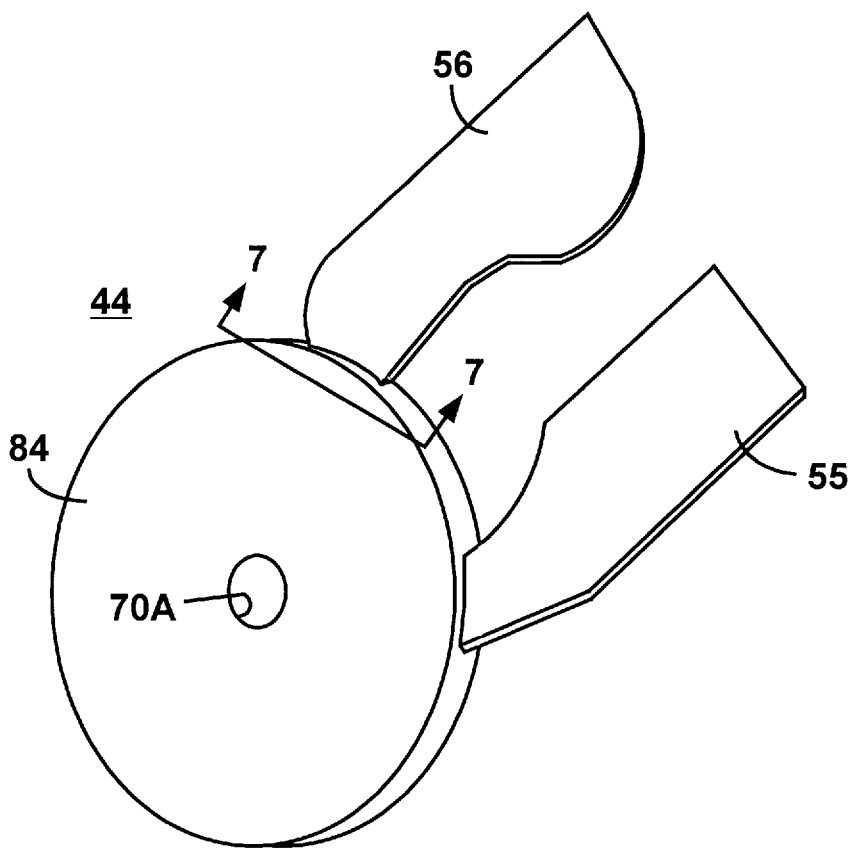
FIG. 6 is a perspective view of the electro-magnetic coil of FIGS. 3 and 4 without contact pads.

In the embodiment shown in FIG. 5 the height of the tip 97 above the substrate 52 is approximately equal to the height of the first layer 160. It should however be understood that the height of the tip 97 may vary in order to provide optimal optical and magnetic performance of the coil 44. In the embodiment shown in FIG. 5A, the tip 95 is eliminated, and the yoke tip 97 extends to, or in proximity to in the substrate 52, closer to the optical opening 100.

The yoke 84 is made of a suitable ferromagnetic high permeability material such as 81 Ni:19 Fe nickel iron alloy. The yoke 84 has a substantially uniform thickness that ranges between approximately 1 micron and approximately 8 microns, and preferably between approximately 1 microns and approximately 4 microns. A distinctive feature of the coil 30 is that the yoke 84 is formed on top of the insulation layer 86 and the conductor 50, but does not extend within the optical opening 70 defined by the first layer 160. The thickness of the yoke 84 ranges between approximately 1 $\mu$m and approximately 6 $\mu$m. It should be clear that the quantities and dimensions mentioned herein are simply for purposes of illustration and that other values can be used instead.

In another embodiment, the yoke 84 is covered by an overcoat layer (not shown) for added protection and insulation. The overcoat layer provides an optical passage that coincides with the optical openings 70, 70A for allowing the optical beam 72 to pass through the coil 44.

As illustrated in FIG. 5, the yoke 84 of the coil 44 is surface-mounted on the underside of the optical assembly 40 (or the slider 37) by means of available techniques, such as adhesive 112.

Figure 7:
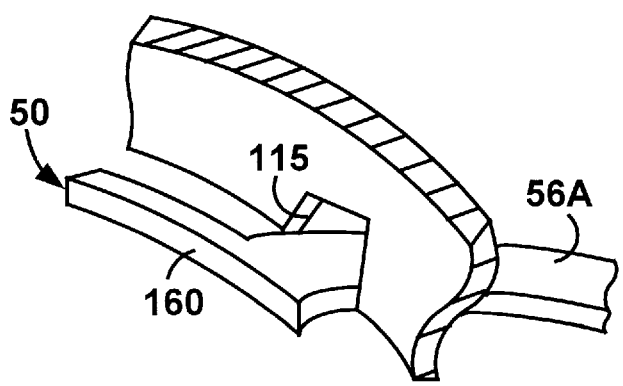
FIG. 7 is an enlarged, fragmentary, cross-sectional view of the coil of FIG. 6 taken along line 7—7, illustrating the entrance of a coil conductor through a yoke forming part of the coil.

FIG. 7 illustrates an opening 115 formed in the yoke 84 to allow the first layer 160 to pass through the yoke 84 for connection to the contact pad 56. Another (or the same) opening is formed in the yoke 84 to allow the second layer 161 to pass through from connection to the contact pad 55. While the terminal ends 55A, 56A and the corresponding contact pads 55, 56 are shown in this exemplary embodiment to be separated, it should be understood that in another embodiment they can be superimposed (or stacked) but electrically insulated from each other.

Another coil 200 will now be described in connection with FIGS. 10, 10A, 10B, 11, 12, 13. The coil 200 includes a conductor 232 which is encapsulated in part within an insulation layer 256, which, in turn, is covered with a yoke 255. The coil 200 is deposited or made on an undercoat layer 252 upon which the coil 232 is formed.

Figure 10:
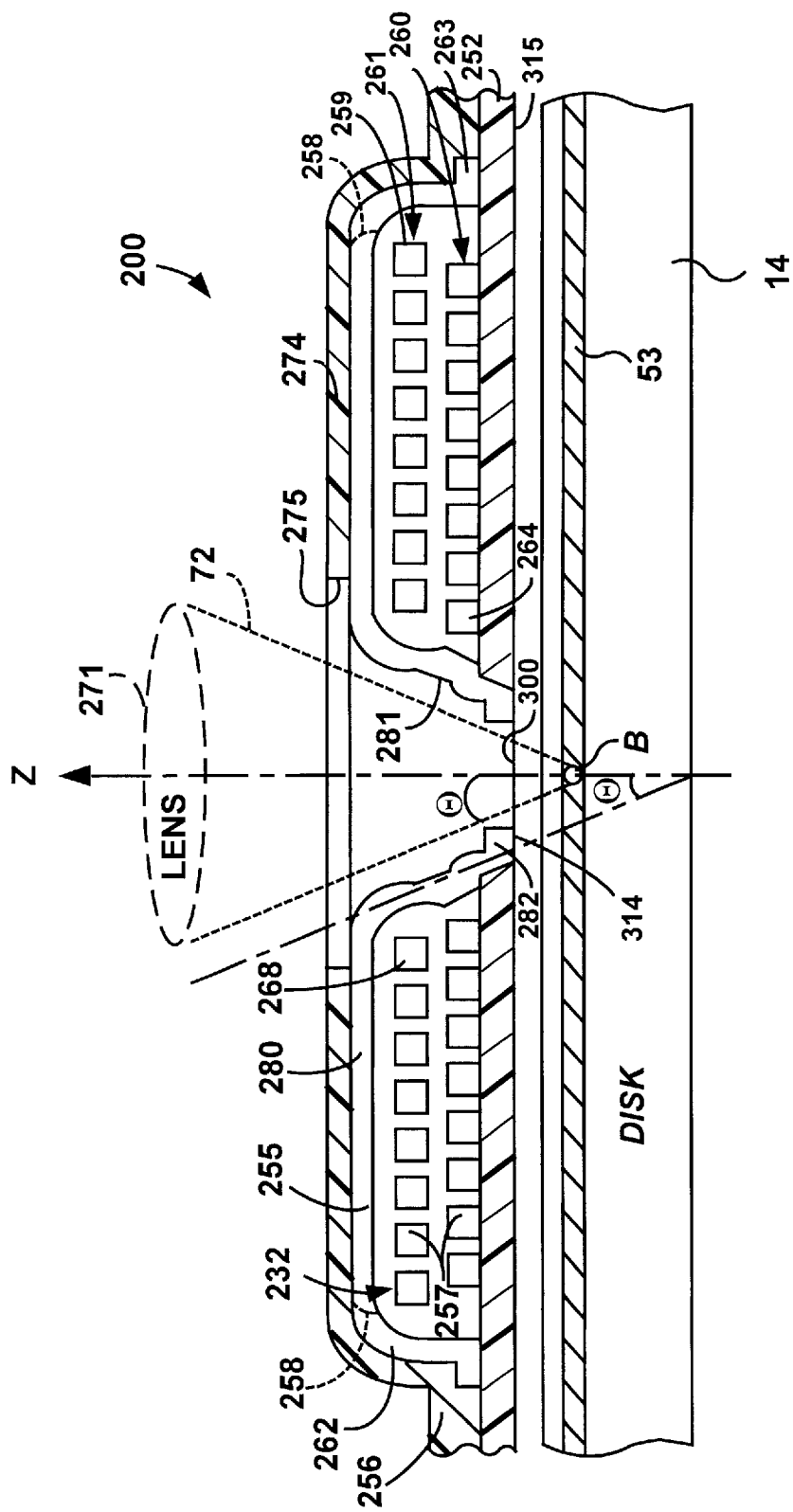
FIG. 10 is a cross-sectional view of an electro-magnetic coil according to another embodiment of the present invention, taken along line 10—10 in FIG. 10A.
Figure 11:
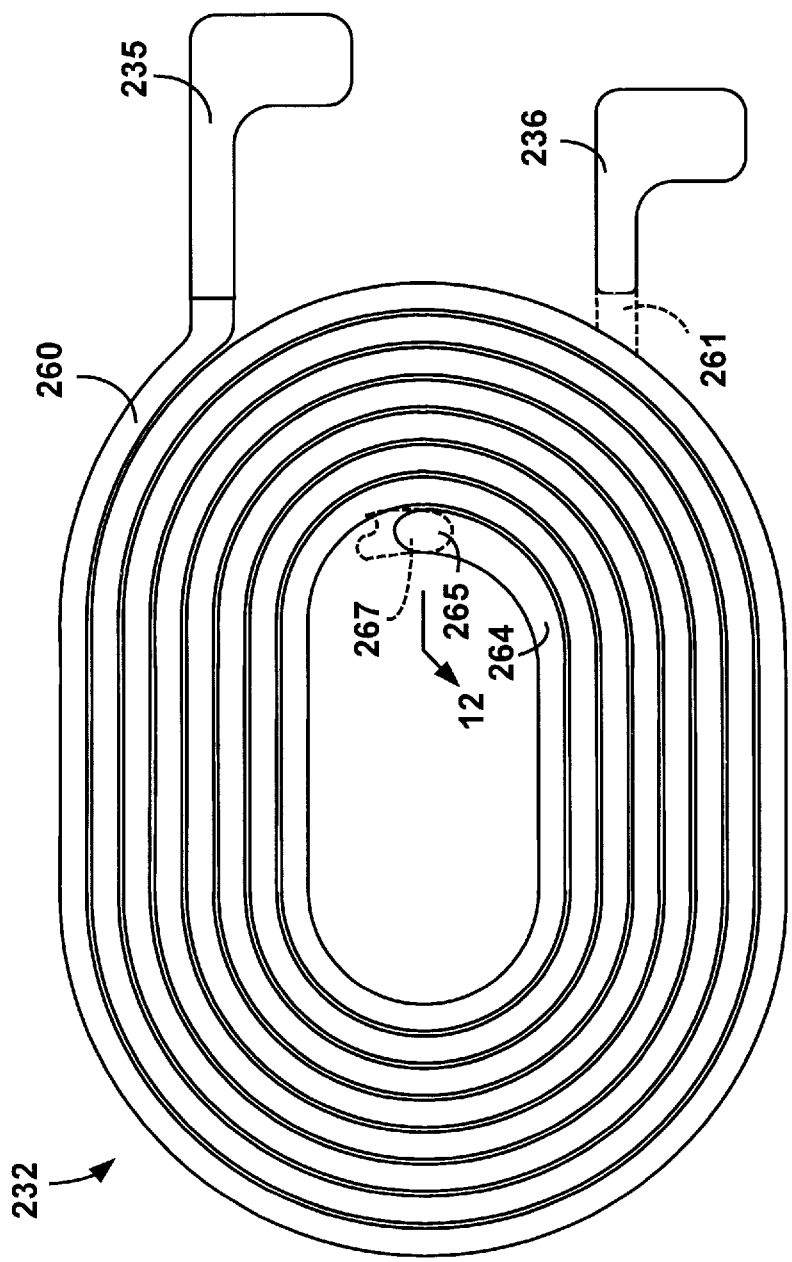
FIG. 11 is an enlarged bottom plan view of a coil forming part of the coil of FIG. 10, showing only a bottom or first layer and two contact pads.

The conductor 232 includes a plurality of multi-layered turns 257, with only two layers 260, 261 are shown. The first or bottom layer 260 is connected to a contact pad 235 (FIG. 11) and is looped helically, inwardly, and terminates in an innermost turn 264 (FIGS. 10, 11) with a terminal end 265 (FIGS. 11, 12). The second or upper layer 261 starts with a terminal end 267 (FIGS. 11, 12) of an innermost turn 268 (FIG. 10). The innermost terminal end 267 of the second layer 261 overlays the innermost end 265 (FIG. 12) of the first layer 260, in order to establish an electrical contact therewith, and to ensure the continuity of the electrical path formed by the conductor 232. The second layer 261 is coiled into a plurality of concentric helical turns 257 in the same coiling direction as the first layer 260, and terminates in the contact pad 236. The conductor 232 has a similar composition and cross-sectional area as the conductor 50.

Figure 10A:
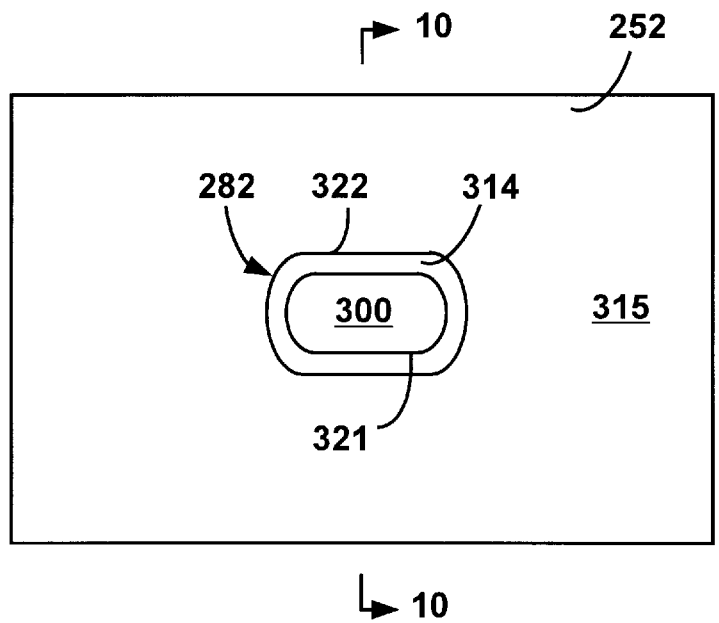
FIG. 10A is a bottom plan view of the coil of FIG. 10.

With reference to FIGS. 10 and 10A, the yoke 255 has similar or equivalent composition and cross-sectional area as the yoke 84. In one embodiment an outermost edge 258 (shown in dashed lines) of the yoke 255 extends beyond an outermost edge 259 of the conductor 232, which, in this illustration is the outermost edge of the uppermost layer 261, so that the yoke 255 covers the conductor 232.

The yoke 255 is generally formed of three sections made using available thin film wafer technology: an upper section 280, a sloping (or intermediate) section 281, and a tip 282 (also interchangeably referred to as toe 282). The upper section 280 is generally flat and disk shaped, and is formed on the insulation layer 256, on top of the uppermost layer 261 (in this example the second layer). The upper section 280 extends integrally (or continuously) into the sloping section 281 that covers an inner side of the insulation layer 256. The sloping section 281 has a generally conical shape. The sloping section 281 extends continuously into the tip 282. The tip 282 is generally flat and ring (or cylindrically) shaped.

Figure 13:
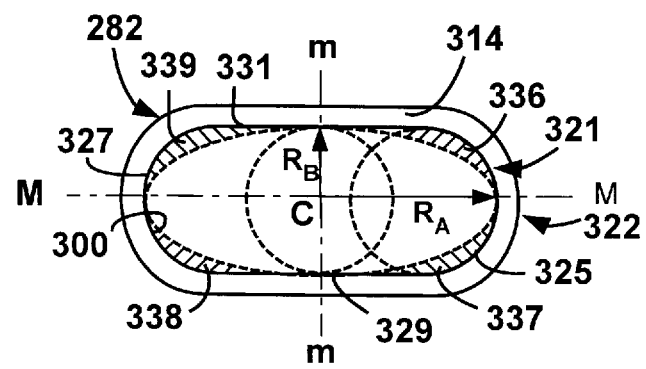
FIG. 13 is an enlarged bottom plan view of a pole tip according to the present invention forming part of the coil of FIG. 11.
Figure 10B:
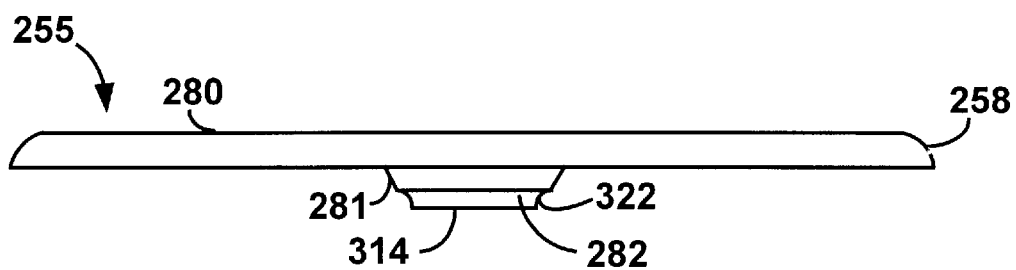
FIG. 10B is a side elevational view of the yoke forming part of the coil of FIG. 10 with the contact pads removed.

An important distinctive feature between the coil 44 of FIG. 5 and the coil 200 of FIGS. 10, 10A, 13, is the close proximity of the yoke tip 282 relative to the disk 14. As a result, the size of the central optical opening 70, 300 is reduced, increasing the magnetic field density at the target point B. While the yoke tip 97 of the coil 44 (FIG. 5) is separated from the substrate 52 by the insulation layer tip 95, the underside 314 (FIGS. 10, 10B) of the yoke tip 282 extends substantially to the level of the underside 315 of the undercoat 252, so that the yoke underside 314 is substantially flush with the undercoat underside 315. The coil 200 includes an optical opening 300 defined by the yoke tip 282. Consequently, the yoke tip 282 is positioned closer to the target point B, thus further enhancing the magnetic field density at the target point B.

The shape of the yoke 255 will now be described with reference to FIGS. 10, 10A and 13. In addition to the foregoing advantages presented by the yoke tip (282) design, the yoke 255 provides an optimal unobstructed travel trajectory for the optical beam 72. The optical beam 72 is focused on the target point B by means of a lens 271 (or another optical device shown in a dashed line). The optical beam 72 is conically shaped and defines an angle Θ with the Z-axis. The sloping section 281 of the yoke 255 is sloped at angle of approximately Θ relative to the Z-axis, so as to accommodate the optical beam 72. FIG. 10 illustrates a cross-sectional view of the coil 200 along a minor axis (line 10—10 in FIG. 10A) of the yoke tip 282, and shows the center line of the yoke sloping section 281 to be substantially parallel to the optical beam 72. The distance between the yoke sloping section 281 and the optical beam 72 ranges approximately 2 microns and approximately 15 microns, and preferably between approximately 3 microns and approximately 6 microns.

The yoke tip 282 is shaped to allow optimal cross-track excursion of the optical beam 72. To this end, the underside 314 of the yoke tip 282 is defined by an inner edge 321 and an outeredge 322 that are generally concentric relative to each other. The inner edge 321 delineates the optical opening 300, and is formed of two arcuate sections 325, 327, and two linear sections 329, 331.

The arcuate sections 325, 327 are generally symmetrical relative to a minor axis m—m passing through a geometric center C of the inner edge 321. In a preferred embodiment, the arcuate section 325 is semi-circularly shaped with a radius $R_B$ ranging between approximately 3 microns and approximately 15 microns, and preferably between approximately 5 microns and approximately 10 microns.

The linear sections 329, 331 are generally symmetrical relative to a major axis M—M passing through the geometric center C of the inner edge 321. Each linear section 329, 331 is tangential to the arcuate sections 325, 327, and has its length ranging from approximately 3 microns and approximately 15 microns, and preferably between approximately 6 microns and approximately 8 microns.

The optical beam 72 can travel a distance of $(2 R_A)$ along the major axis M—M, where $R_A$ ranges between approximately 6 microns and approximately 18 microns, and preferably between approximately 8 microns and approximately 12 microns. The present shape of the yoke tip 282 provides a significant advantage over an elliptically shaped optical opening (shown in a dashed line in FIG. 13), since the present optical opening 300 offers a wider passageway to the optical beam 72, as denoted by the four shaded regions 336, 337, 338, 339. As a result, the optical beam 72 can maintain a desired spot size and shape on the disk. 14.

In another preferred embodiment, the yoke 255 further includes an outer section 262 that extends over the peripheral side of the insulation layer 86, and that further extends in an enlarged toe section 263.

The coil 200 further includes an overcoat layer 274 that overlays the yoke 255 for added protection and insulation. The overcoat layer 274 and the undercoat layer 252 can be made of any suitable insulating material, for example alumina. An opening 275 in the overcoat layer 274 is co-aligned with the yoke 255 to allow unobstructed passage of the optical beam 72.

The coil overcoat layer 274 or the yoke 255, is surface mounted on, or bonded to the slider underside 46 (FIG. 2) and/or the optical assembly by means of available techniques, such as an adhesive.

The design objectives of the coils 50 and 232 can meet or exceed the following requirements:
 a Coil current: less than, or equal to approximately 50 mA.
 Magnetic field: greater than, or equal to approximately 200 to 300 Oersteds.
 Coil Self-inductance: less than, or equal to approximately 60 to 100 nH.
 Capacitance: less than, or equal to approximately 3 to 5 pF.
 Resistance: less than, or equal to approximately 10 Ω.
 Input voltage: less than, or equal to approximately 7 V.
The foregoing values are provided for illustration purpose only, and the design criteria of the coils described herein can be varied with the desired applications.

Figure 14:
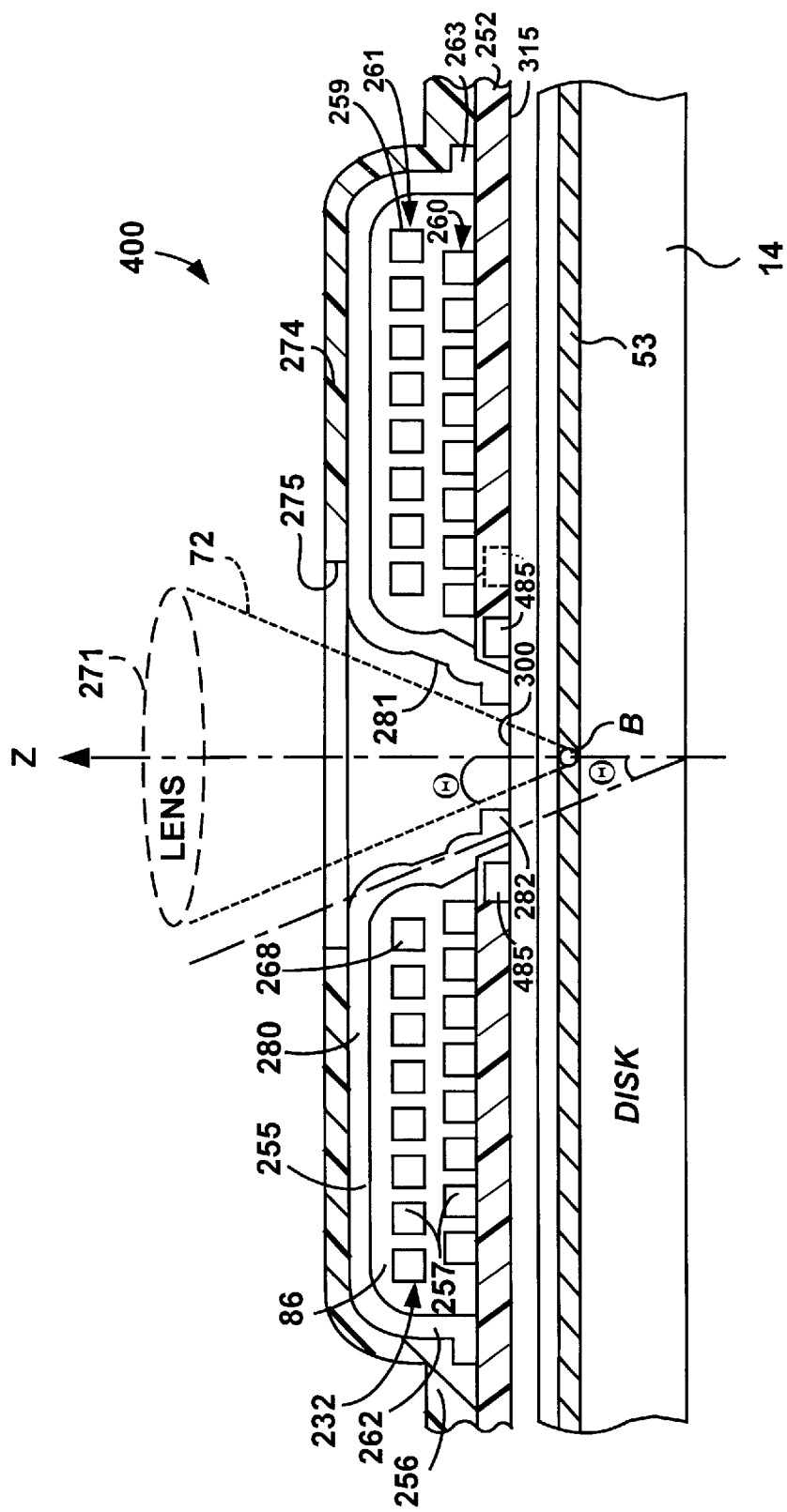
FIG. 14 is an enlarged, cross-sectional view of an electro-magnetic coil according to still another embodiment of the present invention, taken along line 10—10 of FIG. 10A.

FIG. 14 illustrates another coil 400 according to the present invention. The coil 400 is similar to the coil 200 in construction and design, and its conductor 232 further includes an additional turn 485 formed within the undercoat layer 252. The turn 485 is positioned in close proximity to the yoke tip 282 and to the target point B, so as to further enhance the magnetic field density at the target point B. Additional turns 485 (shown in a dashed line) can also be formed within undercoat layer 252, as needed.

Figure 15:
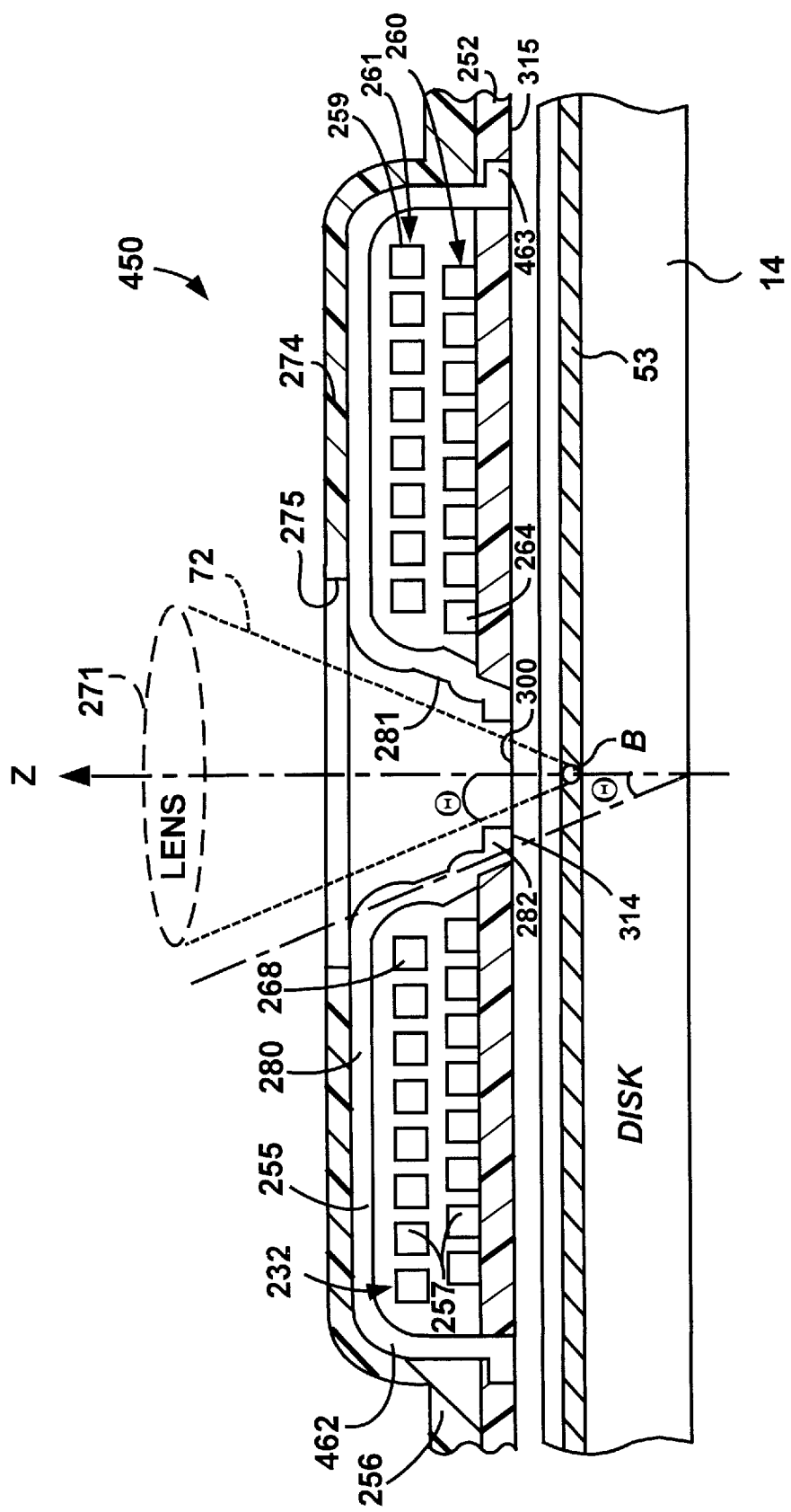
FIG. 15 is an enlarged, cross-sectional view of an electro-magnetic coil according to yet another embodiment of the present invention, taken along line 10—10 of FIG. 10A.

FIG. 15 illustrates another coil 450 that is generally similar to any of the coils described herein, and in particular to the coils 200 (FIG. 10) and 400 (FIG. 14), wherein the yoke 255 includes an outer section 462 that extends over the peripheral side of the insulation layer 86, and further extends through at least part of the undercoat layer 252. In another embodiment, the outer section 462 extends in an enlarged toe section 463 which is substantially flush with the underside 315 of the undercoat layer 252.

It should be understood that the geometry, compositions, and dimensions of the elements described herein are provided for the purpose of illustration only, and are not intended to be the exclusive; rather, they can be modified within the scope of the invention.

What is claimed is:

1. A thin-film coil formed on an undercoat layer having an underside, for use in a data storage system comprising:
   a coiled conductor formed on the undercoat layer;
   said conductor being covered, at least in part, by an insulation layer;
   a yoke formed on said insulation layer for providing a magnetic path to a magnetic field generated by said conductor;
   said yoke including a tip having an underside, and defining an optical opening; and
   said yoke tip underside being substantially flush with the undercoat layer underside for increasing the density of said magnetic field at a target distance from the coil.

2. A coil according to claim 1, wherein said yoke is formed of three sections: an upper section, an intermediate section, and said tip.

3. A coil according to claim 2, wherein said upper section is substantially flat and disk shaped, and is formed on said conductor.

4. A coil according to claim 2, wherein said upper section extends integrally into said intermediate section; and
   wherein said intermediate section extends over an inner side of said conductor.

5. A coil according to claim 4, wherein said intermediate section is substantially conically shaped.

6. A coil according to claim 2, wherein said intermediate section extends continuously into said tip; and
   wherein said tip is substantially cylindrically shaped.

7. A coil according to claim 1, wherein said coil terminates in two contact pads for providing electrical connection to said conductor.

8. A coil according to claim 1, wherein said conductor includes a plurality of superimposed multi-layered turns.

9. A thin-film coil formed on an undercoat layer having an underside, for use in a flying magneto-optical data storage system comprising:
   a coiled conductor formed on the undercoat layer;
   said conductor being covered, at least in part, by an insulation layer;
   a yoke formed on said insulation layer for providing a magnetic path to a magnetic field generated by said conductor;
   said yoke including a tip having an underside, and defining an optical opening;
   said yoke tip underside being substantially flush with the undercoat layer underside for increasing the density of said magnetic field at a target distance from the coil;
   wherein said conductor includes a plurality of superimposed multi-layered turns;
   wherein said conductor includes a first layer of turns and a second layer of turns;
   wherein said first layer is connected to one of said two contact pads and is coiled helically, inwardly, and terminates in an innermost terminal end; and
   wherein said second layer includes an innermost terminal end that overlays said innermost terminal end of said first layer in order to establish electrical contact therewith, and to ensure the continuity of an electrical path formed by said conductor.

10. A coil according to claim 9, wherein said second layer is coiled in a plurality of concentric helical turns, similar to, and in the same coiling direction as said first layer.

11. A coil according to claim 1, wherein said conductor is made of an electrically conductive material and has a substantially uniform square cross-sectional area along its entire length.

12. A coil according to claim 11, wherein the cross-sectional area of said conductor ranges between approximately 8 microns and approximately 30 microns.

13. A coil according to claim 1, wherein the undercoat layer is made of alumina.

14. A coil according to claim 1, wherein the undercoat layer includes a detachable tab that facilitates the handling of the coil during manufacture and assembly.

15. A coil according to claim 2, wherein said yoke upper section and intermediate section have a substantially uniform thickness.

16. A coil according to claim 2, wherein said yoke intermediate section is sloped so as to allow an optical beam to pass through said optical opening.

17. A coil according to claim 2, wherein said yoke tip underside is defined by an inner edge and an outer edge that are generally concentric relative to each other; and
   wherein said inner edge delineates said optical opening.

18. A coil according to claim 17, wherein said inner edge is formed of two arcuate sections and two linear sections; and
   wherein said linear sections are generally tangential to said arcuate sections.

19. A coil according to claim 18, wherein said linear sections are symmetrical relative to a major axis M—M passing through a geometric center of said inner edge.

20. A coil according to claim 18, wherein said arcuate sections are generally semi-circularly shaped and symmetrical relative to a minor axis passing through a geometric center C of said inner edge.

21. A coil according to claim 2, further including an overcoat layer that overlays said yoke for added protection and insulation.

22. A coil according to claim 1, wherein said conductor further includes an additional turn formed within the undercoat layer in close proximity to said yoke tip.

23. A coil according to claim 2, wherein said yoke further includes an outer section that extends over a peripheral side of said insulation layer.

24. A coil according to claim 23, wherein said yoke outer section extends in an enlarged toe section.

25. A thin-film coil formed on an undercoat layer through which an optical opening is formed and having an underside, for use in a magneto-optical data storage system comprising:
   a conductor formed on the undercoat layer generally concentrically relative to the optical opening;
   a yoke formed on said conductor for providing a path to a magnetic field generated by said conductor;

said yoke including a tip extending within the optical opening and having an underside; and said yoke tip underside being substantially flush with the undercoat layer underside for increasing the density of said magnetic field at a target distance from the coil.

26. A coil according to claim 25, wherein said conductor includes a first layer of turns and a second layer of turns;

wherein said first layer is coiled helically, inwardly, and terminates in an innermost terminal end; and wherein said second layer includes an innermost terminal end that overlays said innermost terminal end of said first layer in order to establish electrical contact therewith, and to ensure the continuity of an electrical path formed by said conductor.

27. A coil according to claim 1, wherein said conductor includes a first layer of turns and a second layer of turns;

wherein said first layer is coiled helically, inwardly, and terminates in an innermost terminal end; and wherein said second layer includes an innermost terminal end that overlays said innermost terminal end of said first layer in order to establish electrical contact therewith, and to ensure the continuity of an electrical path formed by said conductor.

28. A thin-film coil formed on an undercoat layer having an underside, for use in a magneto-optical data storage system comprising:

a conductor formed on the undercoat layer;

a yoke formed on said conductor for providing a magnetic path to a magnetic field generated by said conductor;

said yoke including a tip having an underside, and defining an optical opening;

said yoke tip underside being substantially flush with the undercoat layer underside for increasing the density of said magnetic field at a target distance from the coil;

wherein said conductor includes a first layer of turns and a second layer of turns;

wherein said first layer is coiled helically, inwardly, and terminates in an innermost terminal end; and wherein said second layer includes an innermost terminal end that overlays said innermost terminal end of said first layer in order to establish electrical contact therewith, and to ensure the continuity of an electrical path formed by said conductor.

* * * * *